United States Patent [19]

Smart

[11] 4,407,879
[45] Oct. 4, 1983

[54] METHOD OF PRODUCING A TEXTURED FILM

[75] Inventor: John A. Smart, Newark, Ohio

[73] Assignee: Northern Petrochemical Company, Omaha, Nebr.

[21] Appl. No.: 290,860

[22] Filed: Aug. 7, 1981

[51] Int. Cl.³ .................. B32B 3/30; B32B 27/32
[52] U.S. Cl. .................. 428/141; 264/280; 264/342 KE; 264/345; 264/348; 428/212; 428/332; 428/500; 428/910
[58] Field of Search .............. 428/500, 910, 212, 141, 428/332; 264/342 RE, 345, 284, 342 R, 348, 280

[56] References Cited

FOREIGN PATENT DOCUMENTS 51-31774  3/1976  Japan .................................. 428/141
1188968  4/1970  United Kingdom ................ 428/910

Primary Examiner—Paul J. Thibodeau
Attorney, Agent, or Firm—Donald F. Haas

[57] ABSTRACT

A method for producing textured thermoplastic film and the textured film produced thereby. A transverse section of a continuous length of preformed thermoplastic film, comprised of two or more components possessing dissimilar softening point temperatures, is heated by a direct contact heating medium. The temperature of the film is thereby raised to or near the softening point of at least one component in the film, yet below the softening point of at least one other component. A partial amount of previously applied orientation is relieved by the softening of at least one component in said film. Correspondingly, a partial amount of the previously applied orientation remains unrelieved due to the presence of at least one unsoftened component in said film. This causes the formation of protuberances in the film which creates a textured look and feel. The resulting textured film, described herein, is suitable for many applications such as decorative coverings, release films, and protective overwrap packaging films.

9 Claims, 1 Drawing Figure

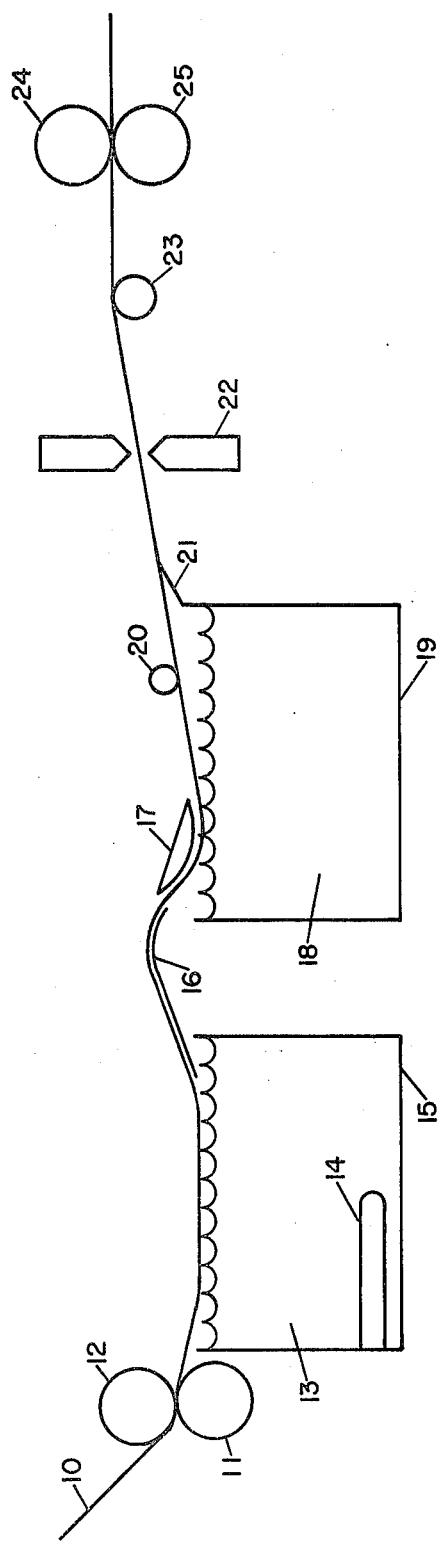

METHOD OF PRODUCING A TEXTURED FILM

BACKGROUND OF THE INVENTION

1. Field of Invention

The present invention relates to a method for producing textured thermoplastic film and to the textured thermoplastic film produced thereby.

2. Description of the Prior Art

Textured sheet material has been widely applied in many fields. One particularly large scale use of textured sheet material is that of decorative coverings such as those used on ceiling and wall construction materials. Textured film is also increasingly being applied in the packaging field, for example, as protective overwraps for delicate articles such as electronic assemblies, glass, etc. Furthermore, textured film sheeting is used as a release mechanism in the production of rubber and associated materials. It is desirable that the film have suitable characteristics in order to fulfill requirements dictated by the end use. In many cases, it is important that the textured film have sufficient protuberance height in order to provide cushion properties, particularly when used for protective overwrap packaging. Additionally, many uses of textured film, for example, ceiling construction materials, require a pattern of random design. Textured sheet materials must meet minimum physical specifications, such as tensile strength, impact strength, and secant modulus, so that the films can be handled on fabricating machines.

Historically, textured films such as polyethylene, polypropolene, polybutene-1, and other films have been produced by various methods. One method used to produce textured film is to mechanically emboss a textured impression into the film. An embossing process used heretofore to produce a textured film comprising passing the film over a heated roll or series of heated rollers in order to heat the film to a softened state, contacting the film with an embossing roller; and pressing the film against the embossing roller with a back-up roller which has a resilient covering. Normally, the embossing roller and the back-up roller are cooled in order to freeze the textured pattern engraved on the embossing roll into the film so that it can be immediately wound onto rollers. An apparatus and process for preparing a textured embossed film according to the foregoing is shown in U.S. Pat. No. 3,246,365.

A major drawback of using an embossing process to produce textured film is the limitation of texture characteristics, such as protuberance height, size, spacing, etc. In order to alter the characteristics of the textured pattern, it is necessary to replace the embossing roll with a different embossing roll which bears the altered pattern characteristics. Furthermore, when embossing rolls which bear high protuberances are used for producing textured film, it is normally necessary to replace the resilient covered roll after a relatively short period of operation because protuberances of substantial height in the embossing roll quickly and severely wear the resilient covering. The worn resilient covered roll eventually lacks the smoothness needed to obtain adequate surface contact across the face of the embossing roll and therefore will not produce an acceptable textured film product. Obviously, the replacement costs adversely affect the economics of this method.

U.S. Pat. No. 3,180,775, issued Apr. 27, 1965, discloses a method of making non-woven fabrics by creating webs of shrinkable and non-shrinkable fibers which are bonded together and then subjected to shrinking conditions (including heat). This causes the non-shrinkable fibers to become puffed and distended and form ripples in the surface of the fabric. While this disclosure is somewhat similar to the present invention, there is no mention of using materials with dissimilar softening points or relieving orientation in one of the materials but not the other by heating both to a temperature above the softening point of one and below the softening point of the other.

Therefore, it can be seen that the textured film art is in need of the process of the present invention whereby preformed film, composed of two or more components possessing dissimilar softening points, can be heated to a sufficient temperature and cooled to obtain permanent protuberances in the film and yet which will permit a wide variation in the composition of the film and will utilize operating parameters which will provide a wide variation in protuberances such as height, size, spacing and general form.

It is an object of the present invention to provide a process for producing textured film which permits a wide variation in the character of the protuberances in the film.

It is a further object of the present invention to provide a method for producing textured film from a sheet film produced using the blown bubble process.

It is a still further object of the present invention to produce a textured film possessing desirable physical properties.

SUMMARY OF THE INVENTION

The process aspects of the present invention may be carried out by passing a length of preformed oriented film of a blend of at least two thermoplastic components through a zone wherein the film is heated by a direct contact or other heating medium to raise the temperature of the film to or near the softening point of at least one component in the film, yet below the softening point of at least one other component in the film. Part of the orientation is relieved by the softening of at least one component in the film. Correspondingly, part of the orientation remains unrelieved due to the presence of the unsoftened component in the film. This causes the formation of protuberances in the film. The resulting textured film is cooled to provide a fixed impression. The film can then be wound on a roll. A textured film can be created which has protuberance heights between 1/32 inch and ¼ inch, protuberance form of random or repetitive design, protuberance spacing of 1/100 inch to ½ inch, and protuberances numbering from 10 points/square inch to 150 points/square inch.

BRIEF DESCRIPTION OF THE DRAWING

The FIGURE is a schematic side view of an apparatus for carrying out the process of the present invention and for producing the textured film of the present invention.

DESCRIPTION OF THE PREFERRED EMBODIMENTS

Referring to the FIGURE, there is depicted an apparatus for carrying out the process for producing the textured film of the present invention. A preformed, flat, longitudinally extending, endless web or sheet of oriented thermoplastic film 10 composed of two or more components possessing dissimilar softening point temperatures is fed through the nip of counter-rotating, driven pull rolls 11 and 12. Pull rolls 11 and 12 are preferably driven by a variable speed drive mechanism (not shown) and are preferably mounted such that the film exiting the nip thereof falls directly onto the surface of the liquid heating medium 13. The film then passes downwardly onto the surface of liquid heating medium 13 which is contained within vessel 15. While the FIGURE and the description of the preferred apparatus indicate that pull rolls may be used to feed the film onto the surface of the liquid heating medium, it is not necessary that pull rolls be used. Any means of feeding the film onto the surface of the liquid is suitable. The liquid heating medium 13, which is preferably ethylene glycol, is heated by a controlled submersible heat source 14. The film 10, which may be at ambient temperature prior to contacting the surface of the liquid heating medium 13, is rapidly heated by direct contact with the liquid 13 to raise the temperature of the film to or near the softening point of at least one component in the film, yet below the softening point of at least one other component in the film. Other means of heating, such as warm air or induction heating, can be used in place of the liquid heating medium. Part of the orientation is relieved by the softening of the lower softening point component in the film and part of the orientation remains unrelieved due to the presence of the unsoftened component. The discontinuity thus created causes the formation of protuberances in the film, giving it a textured look and feel.

The resulting textured film then passes over a wiping ramp 16 which removes the excess liquid heating medium 13 remaining on the film. While it is not critical that wiping ramp 16 be fabricated of a specific material, it is preferred that the surface of the ramp exhibit non-stick properties in order to prevent the textured film web from adhering to the ramp. In addition, it is preferred that the design of wiping ramp 16 allow the web to fall directly into the open body of liquid solvent 18. The film then passes under immersion guide 17 to force the film under the surface of the liquid solvent 18, which is preferably water. The immersion guide 17 is preferably located in a position which allows the removal of the liquid heating medium from both sides of the textured film web. Solvent 18, which is contained within vessel 19, is cooled by an external cooling source (not shown) to a temperature which is sufficiently low to cause the previously softened component or components to return to an unsoftened state. The textured film is thereby cooled to provide a permanent texture in the film. Preferably, in addition to its cooling function, solvent 18 acts as a dissolving agent to remove any residual liquid heating medium 13. While the use of a liquid solvent is desirable, any means of cooling the film, such as chilled or ambient air, could be used.

The film then passes under wiper bar 20 and over wiper strip 21 which preferably have their contact surfaces covered with an absorbent material which assists in removing the excess solvent 18 remaining on the film. They are positioned in a manner which serves to remove the excess solvent 18 and return it to vessel 19. Air stripper 22 also assists in removing residual amounts of liquid solvent 18. The air stripper preferably strikes both sides of the textured film web with a high velocity stream of air to blow off and/or evaporate the solvent 18. After passing over idler roll 23 to assure proper alignment of the web, it enters the nip of counter-rotating, driven pull rolls 24 and 25 which are preferably driven by a variable speed drive mechanism (not shown) that offers a method of speed control which permits adjustment of the web tension between the nip formed by pull rolls 11 and 12 and the nip formed by pull rolls 24 and 25. Proper control of the tension of the film web between the nip of rolls 11 and 12 and the nip of rolls 24 and 25 is important to the effective use of the process of the present invention. The tension is preferably controlled by an electronic tension sensor, an electromechanical tension sensor, or any suitable method which offers sufficient tension control to prevent web stretching or breaking. The textured film web can then be wound on a roll.

The temperature to which the traveling film is heated depends upon the thermoplastic materials from which the film is made. It is a very important feature of the present invention that the temperature of the oriented film be raised to or near the softening point of at least one component in the film, yet below the softening point of at least one other component. Softening point means a temperature sufficiently high enough to relax an amorphous or noncrystalline film. Heating to the proper temperature will relieve part of the orientation by softening at least one component in the film, but will not relieve all of the orientation since at least one component in the film remains unsoftened. The discontinuity thus created causes the formation of protuberances and creates a textured effect in the film. A textured film can be created which has protuberance heights between 1/32 inch and ¼ inch, protuberance form of random or repetitive design, protuberance spacing of 1/100 inch to ½ inch, and protuberances numbering from 10 points/square inch to 150 points/square inch.

The process of the present invention may use any film which is formed by the combination of two or more thermoplastic components which results in a film possessing two or more distinct softening point temperatures. For best results, the temperature difference should be 10° C. to 30° C. Also, as little as 1.4% of the higher softening point material can be used. Polyolefins are the preferred type of thermoplastic for use in the present invention. Highly preferred blends or mixtures are the combination of high density polyethylene and low density polyethylene and the combination of polypropylene and low density polyethylene. However, other thermoplastics and combinations thereof can also be used in the present invention. Such thermoplastics may include thermoplastic polyesters, polyamides, polystyrenes (including ABS), polycarbonates, polyacrylates, polyvinyls (including polyvinylidenes), thermoplastic polyurethanes, polyacetals, ionomers, copolymers of the above, and elastomers.

The foregoing listed thermoplastics can be combined in any number of different ways. There are only two limitations upon the combination of these materials. First, the materials used must be sufficiently compatible with each other in order to blend and produce a usable film product. Second, the softening point temperatures of the materials used must differ to a sufficient extent to allow at least one component within the film to remain unsoftened when at least one other component softens. It should be noted that polymers within each of the above families can be used as possible blending components. An example of this is the aforementioned combination of low density polyethylene and high density polyethylene.

The films which are to be treated according to the present invention can be prepared in any conventional manner. Processes for the preparation of such films are well-known in the industry and the art and thus will not be specifically disclosed herein. Furthermore, the orientation of the films which are to be treated according to the present invention can be carried out in any conventional manner. Methods for orienting such films are well-known and will not be discussed herein.

The following examples are meant only to illustrate the invention and not to limit it in any way.

The process of the present invention has been used to prepare textured film from film formed by extrusion blending low density polyethylene and high density polyethylene having a thickness from 1.25 mils to 3.0 mils. These films have textured thicknesses from 2 mils to 9 mils. The height of the protuberances in the film is directly related to the speed of film web passing through the process. A lower speed of 20 feet per minute has resulted in an average textured film thickness of 3.9 mils when using a 1.5 mil untextured film. A faster speed of 30 feet per minute results in an average textured film thickness of 2.1 mils when using a 1.5 mil untextured film. The flexibility of the protuberance height allows for a wide range of textured thickness by changing the film web speed.

Textured film produced from 1.25 mil untextured film exhibits improved impact strength. The impact strength of an untextured 1.25 mil film formed by extrusion blending 70 percent low density polyethylene and 30 percent high density polyethylene had an impact strength of 52 grams. It was found that the texturing process increased the film's impact strength to 158 grams. Machine direction tear resistance was also found to increase after texturing. The machine direction tear resistance prior to texturing was 42 grams per mil. After texturing, the machine direction tear resistance was increased to 127 grams per mil. Representative values of other film properties before and after texturing are presented in Table I. Table II illustrates operating conditions used to produce the textured film materials.

TABLE I

| Property | Units | Film Type | | | |
| --- | --- | --- | --- | --- | --- |
| | | 70% LDPE/ 30% HDPE | | 40% LDPE/ 60% PP | |
| | | Untextured | Textured | Untextured | Textured |
| M.D. Tensile | psi | 4286 | 2142 | 2053 | 1792 |
| T.D. Tensile | psi | 2354 | 1647 | 2140 | 2126 |
| M.D. Elongation | % | 267 | 197 | 253 | 107 |
| T.D. Elongation | % | 190 | 117 | 323 | 90 |
| M.D. Modulus @ 1% | psi | 47619 | 12766 | 41935 | 11320 |
| T.D. Modulus @ 1% | psi | 71428 | 22440 | 67742 | 18520 |
| M.D. Tear Strength | grams/mil | 41.9 | 127.0 | 34.0 | 66.5 |
| T.D. Tear Strength | grams/mil | 664.5 | 211.0 | 190.8 | 128.0 |
| Avg. Textured Thickness | mil | — | 2.97 | — | 4.98 |
| Thickness By Weight | mil | 1.26 | 2.35 | 3.13 | 5.29 |
| Impact Strength | grams | 51.9 | 158.0 | 99.3 | 119.9 |

TABLE II

| Operating Conditions | Film Type | |
| --- | --- | --- |
| | 70% LDPE/ 30% HDPE | 40% LDPE/60% PP |
| Liquid Heating Medium Temp. °C. | 128 | 130 |
| Liquid Solvent[5] Temperature °C. | 21 | 21 |

[1]Low Density Polyethylene, Density = 0.919, Melt Index = 1.0, softening point = 90° C.
[2]High Density Polyethylene, Density 0.945, Melt Index = 0.4, softening point = 126° C.
[3]Polypropylene, Density = 0.902, Melt Index = 0.6, softening point = 150° C.
[4]Ethylene Glycol.
[5]Tap Water While there has been described what is at present considered to be the preferred embodiments of the present invention, it will be apparent to those skilled in the art that various modifications and changes may be made without departing from the essence of the invention. It is intended to cover herein all such modifications as come within the true scope and spirit of the following claims.

I claim:

1. A method for producing a textured thermoplastic film which comprises the steps of:
   (a) preparing a film from a blend or mixture of at least two compatible thermoplastics which have distinctly dissimilar softening points,
   (b) orienting the film,
   (c) heating the film to a temperature at or near the softening point of at least one of the thermoplastics to soften it but sufficiently below the softening point of at least one of the other thermoplastics to allow it to remain unsoftened, thereby relieving part but not all of the orientation of the film and causing the formation of protuberances in the film, said protuberances being 1/32 to ¼ inch in height, and
   (d) cooling the film.

2. The method of claim 1 wherein the film is comprised of low density polyethylene and high density polyethylene.

3. The method of claim 1 wherein the film is comprised of low density polyethylene and polypropylene.

4. The method of claim 1 wherein the thermoplastic with the higher softening point comprises at least 1.4% of the blend 5. The product produced by the process of claim 1.

6. A textured film product comprised of at least two compatible thermoplastics which have distinctly dissimilar softening points and characterized by protuberances which are 1/32 to ¼ inches in height and spaced 1/100 to ½ inch apart, and which number from 10 to 150 points per square inch of film surface.

7. The product of claim 6 wherein the film is comprised of low density polyethylene and high density polyethylene.

8. The product of claim 6 wherein the film is comprised of low density polyethylene and polypropylene.

9. The product of claim 6 wherein the thermoplastic with the higher softening point comprises at least 1.4% of the blend.

* * * * *